(12) United States Patent
Kuwert et al.

(10) Patent No.: US 7,122,929 B2
(45) Date of Patent: Oct. 17, 2006

(54) SPINDLE MOTOR FOR DISK DRIVING DEVICE

(75) Inventors: Oswald Kuwert, Am Sonnenberg (DE); Juergen Oelsch, Saaleblick (DE); Kenji Fukunaga, Kitasaku-gun (JP)

(73) Assignee: Minebea Co., Ltd., Kitasaku-Gun (JP)

( * ) Notice: Subject to any disclaimer, the term of this patent is extended or adjusted under 35 U.S.C. 154(b) by 0 days.

(21) Appl. No.: 10/885,697

(22) Filed: Jul. 8, 2004

(65) Prior Publication Data

US 2004/0245867 A1 Dec. 9, 2004

Related U.S. Application Data

(60) Continuation of application No. 10/643,922, filed on Aug. 20, 2003, which is a division of application No. 09/487,803, filed on Jan. 20, 2000, now Pat. No. 6,713,912.

(30) Foreign Application Priority Data

Aug. 23, 1999 (JP) ................................. 11-235454

(51) Int. Cl.
   *H02K 5/16* (2006.01)
(52) U.S. Cl. ....................... 310/90; 310/67 R
(58) Field of Classification Search .............. 310/67 R, 310/90, 89; 360/98.07, 98.08, 99.08
   See application file for complete search history.

(56) References Cited

U.S. PATENT DOCUMENTS

| | | | |
|---|---|---|---|
| 5,025,335 A | 6/1991 | Stefansky | |
| 5,057,732 A | 10/1991 | Fukaya | 310/208 |
| 5,120,091 A | 6/1992 | Nakagawa | 384/279 |
| 5,160,866 A | 11/1992 | Hishida et al. | 310/90 |
| 5,675,452 A | 10/1997 | Nigam | 360/97.02 |
| 5,757,584 A | 5/1998 | Schick | 360/99.08 |
| 5,841,210 A * | 11/1998 | Obara | 310/90 |
| 5,866,961 A * | 2/1999 | Suzuki et al. | 310/67 R |
| 5,933,292 A * | 8/1999 | Obara | 360/99.08 |
| 5,945,753 A | 8/1999 | Maegawa et al. | 310/68 B |
| 5,949,613 A | 9/1999 | Moir et al. | 360/99.08 |
| 5,986,365 A | 11/1999 | Kuwert et al. | 310/51 |
| 6,455,965 B1 * | 9/2002 | Akahori | 310/90 |

* cited by examiner

Primary Examiner—Thanh Lam
(74) Attorney, Agent, or Firm—Oliff & Berridge, PLC

(57) ABSTRACT

If the motor housing 5 is manufactured with a resin, the housing 5 becomes possible to be manufactured by injection molding, so that the housing 5 can be intended to lower the manufacturing cost by a mass production. Further, the counter measures for insulation such as covering a copper wire 7 with an insulating tape, interposing an insulator to an opening 5a of the housing installing an insulating shim between the coil 6a and the housing 5 become unnecessary. As a result, it becomes possible to expect a cost down of the spindle motor due to the reduction of the cost of the parts for insulating members and the mounting processes. And, further, since a vibration transmitted from the rotor 1 through the bearing and a vibration caused by an electric switching of the stator 6 etc. are diminished due to elastic absorbing function of the housing 5, rotation noise of the spindle motor can be reduced.

8 Claims, 2 Drawing Sheets

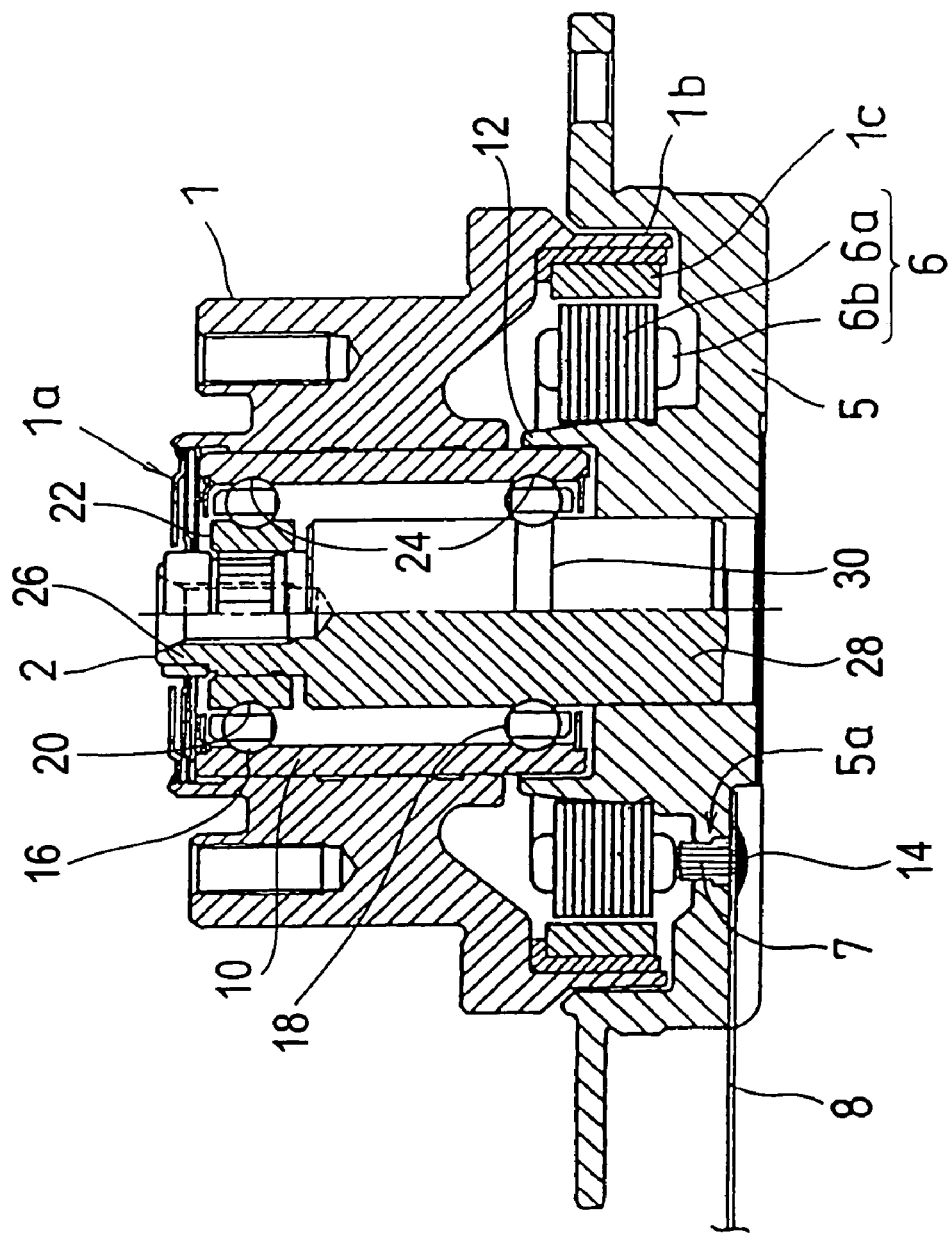

SPINDLE MOTOR FOR DISK DRIVING DEVICE

This is a Continuation of U.S. patent application Ser. No. 10/643,922 filed Aug. 20, 2003 which in turn is a Division of application Ser. No. 09/487,803 filed Jan. 20, 2000 now U.S. Pat. No. 6,713,912 B1 issued Mar. 30, 2004. The entire disclosures of the prior applications are hereby incorporated by reference herein in its entirety.

BACKGROUND OF THE INVENTION

1. Field of the Invention

The present invention relates to a spindle motor suitable for a disk driving device for such as hard disk drive, optical disk drive and removal type of disk drive.

2. Related Art

FIG. 1 is a sectional view of a spindle motor for disk driving device. This spindle motor is used for a so called a removal type of disk drive (ZIP), in which a disk i.e. a recording medium can be replaced upon necessity. And, the spindle motor of FIG. 1 is a so called "shaft rotation type" of spindle motor, in which a shaft 2 is mounted on a rotor 1, the shaft 2 is supported on a housing 5 through a bearing 3.

The rotor 1 comprises a circular disk putting face 1a, around its circumferential end portion, a downwardly depending flange 1b is formed in unitary manner. And, on an inner wall of the downwardly depending flange 1b, a magnet 1c is mounted. In the illustrated example, although the shaft 2 is pressed in and fixed on the central portion of the rotor 1, there is another example in which the shaft 2 is formed in a unitary manner with the rotor 1. Now, since the spindle motor shown is for a ZIP, on the disk putting face 1a too, a magnet 1d for functioning as a disk clamper is provided.

Further, in the spindle motor shown in FIG. 1, in order to increase a rotation precision of the rotor 1, two bearings 3 are used so as to clamp a spacer 4. In the housing 5 with a cylindrical projection portion 12 to be fixed with an outer ring of the bearing 3, a stator 6 is fixed with a coil 6a and stack 6b. A lead wire 7 to supply electricity to a coil 6a supported at the stator 6 is connected to a flexible printed circuit board (FPC) 8 through an opening 5a formed on the housing 5. Further, the spindle motor for disk driving device comprises identical structure in general not limited to the one for ZIP.

Now, recently the operation speed of computer has been increased greatly, accordingly to an information memory medium such as disk drive a further increased capacity has been requested. In general, in order to increase a memory capacity per disk, it is necessary to narrow a track width for writing and reading. However, if a rotation deflection of a spindle motor is great, it becomes difficult to trace such track by the head for writing and reading. In other word, it becomes quite important to increase the rotation precision of the spindle motor so as to increase the memory capacity of the disk driving device. So that, a high precision of parts are requested for components of the spindle motor, and a housing 5 as a basic structure of the spindle motor has been prepared by applying a cutting work by using a NC working machine to a metal material such as aluminous and ferrous materials.

However, a housing to be prepared by cutting work is not preferable in view of a cost reduction. Initially, the cutting work itself is evaluated highly priced from the viewpoint of cost reduction in a mass production. Further, since a surface treatment for corrosion protection is indispensable due to a metal-made, the cost reduction has been made difficult.

Further, although a conventional spindle motor has been developed to increase the rotation precision as a primary target, due to the recent time's demand, it has been mentioned as a problem to be solved to reduce a rotation noise.

The present invention has been made in the light of the above problem, the purpose thereof is to reduce the cost of the components of the housing of the spindle motor and also to diminish the rotation noise of the spindle motor. In addition, further increase of the rotation precision of the spindle motor is intended.

SUMMARY OF THE INVENTION

The spindle motor for the disk driving device according to a first aspect of the present invention, so as to solve the above problem, is what comprises a housing holding a stator and a rotor having a magnet on a cylindrical portion of a circumference and both are supported in such a manner as they are able to rotate relatively through a shaft and bearings, wherein the housing is made of a resin.

According to this invention, the housing can be obtained by an injection molding. Further, since it is made of a resin, after molding it in a necessary configuration, it is not necessary to apply a corrosion protection treatment.

In addition, since the housing bears a given resiliency, it becomes possible to absorb a vibration, to deteriorate a rotation noise.

Further, the spindle motor for disk driving device according to a second aspect of the present invention the housing of which is formed with a super engineering plastic. The super engineering plastic is, comparing with a general plastic resin, high in heat resistance, superior to in strength property, low in heat expansion property, and is able to obtain a state of orientation, all of which properties are required for a material of the housing for a spindle motor for the disk driving device.

Further, the spindle motor for the disk driving device according to a third aspect of the present invention is formed by molding the housing and a spacer between bearings in a unitary manner. Accordingly, it can be intended to reduce the number of components and assembling processes.

Further, the spindle motor for the disk driving device according to fourth aspect of the present invention, the housing and an electric supplying connector are molded in a unitary manner. By this invention too, it can be intended to reduce the number of components and assembling processes for disk driving device.

BRIEF DESCRIPTION OF THE DRAWINGS

FIG. 2 is a sectional view of one embodiment of the shaft fixed type of the spindle motor.

EMBODIMENT

Figure 1:
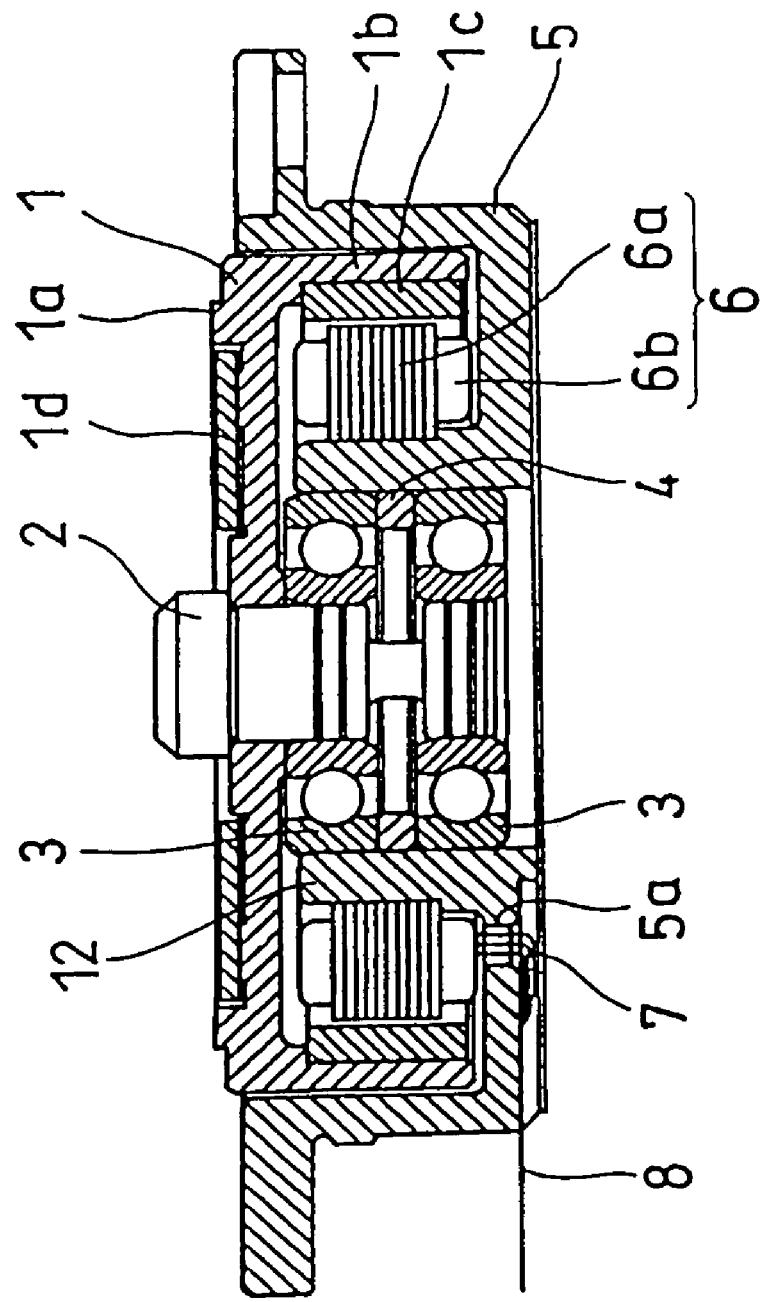
FIG. 1 is a sectional view of one embodiment of the shaft rotation type of spindle motor for disk driving device.

Hereinafter, one embodiment of the present invention is explained referring to attached drawings for disk driving device.

In the embodiment of the present invention, as a housing ZIP shown in FIG. 1, a resin molding due to an injection molding is used. As concrete examples of the resin, a super engineering plastic such as liquid crystal polymer (LCP), polyphenylene sulfide (PPS), polyethersulfon (PES) and polysulfon (PSF) are exemplified.

These super engineering plastics are high in heat resistance, superior in strength, low in heat expansion and obtainable easy orientation. Accordingly, the housing 5 formed with these materials can have mechanical properties not inferior to the conventional metal made housing. Further, since it can be produced by an injection molding, the cost reduction is greatly expected by a mass production.

Further, for instance, it becomes easier to mold the housing 5 and the spacer 4 between the two bearings 3, and it can be intended to reduce the numbers of the components of the spindle motor and the assembling processes. In addition, the housing 5 and the electric supplying connector can be molded in a unitary manner, thereby the identical effect can be obtained. And, in the conventional metal made housing, it has been necessary to conduct an insulating measures such as covering the lead wire 7 with insulating tube, interposing an insulator between the opening 5a of the housing and inserting an insulating shim between the coil 6a and the housing 5, however, according to the embodiment of the present invention, since the housing 5 itself has an insulating property, such measures are adapted to become unnecessary. As a result, the cost of the parts to be used for the insulating measures and the number of assembling processes are reduced and the cost for the spindle motor can be reduced. In addition, since the corrosion protection is not necessary to the housing, from this point too, comparing with the conventional metal made housing, the production cost can be held low.

Now, as a method for molding the housing 5 and the electric supplying connector in a unitary manner, the followings are mentioned: (1) the housing 5 is formed by injection molding while providing tiny holes for connectors opened by necessary numbers, after the molding the connector pins are pressed in the holes, (2) the completed connectors are inserting-molded with the housing 5, (3) providing through holes to make the coil or lead come through, and those are drawn out through these holes to connect to the FPC or connectors, (4) a necessary number of connector pins are molded with the housing 5 by inserting molding.

Further, since the housing 5 itself has a high resiliency compared with the conventional metal made housing, for instance, the vibration transmitted from the rotor 1 to the housing 5 through the bearings 3 and the vibration due to the electric switching of the stator 6 may be diminished by absorbing-function of the housing 5 itself. Thus, the vibration which causes a rotation noise can be absorbed by the housing 5, and comparing with the conventional metal made housing, the rotation noise of the spindle motor can be reduced.

Further, since the housing 5 itself has a high resiliency, comparing with the conventional metal made housing, it is possible to further increase the rotation precision of the spindle motor. The reason is as follows the conventional metal made housing causes to make the outer ring (metal made) of the bearing 3 distorted due to its rigidity to deteriorate the rotation precision of the bearing 3. However, in the embodiment of the present invention, it is not to distort the outer ring of the bearing 3 but to cause the housing to be distorted, so that there is no chance to deteriorate the rotation precision of the bearing itself. Accordingly, the shaft 2 is adapted to be supported in high precision to increase the rotation precision of the spindle motor.

Now, in the embodiment of the present invention, the housing 5 is exemplified as being made of resin, but it is also possible to make the rotor 1 and/or the shaft 2 made of a resin. In addition, in place of the conventional plastic magnet, a rubber magnet is used, then further cost down is intended.

In FIG. 2, so-called "shaft fixed type" spindle motor is shown, in which the shaft 2, with an inner raceway groove 30, is fixed in an annular hole of the housing 5 having a cylindrical projection portion 12, and the rotor 1 is supported on the shaft 2 through the bearing. The motor of FIG. 2 includes a stator 6 with a stack 6b and coils 6a wound around the stack 6b, with the stator 6 mounted on a outer circumference of the cylindrical projection portion 12 of the housing 5 to confront the magnet 1c. The spindle motor also has a lead wire 7 of the coils 6a connected to an electric supplying connector portion 14. The rotor 1 has a central hole and a downwardly depending flange 1b at an outer periphery thereof. The magnet 1c is disposed on an inner peripheral surface of the downwardly depending flange 1b of the rotor 1 with the rotor 1 supported rotatably relative to the housing 5 by a bearing device. The bearing device is a double row ball bearing with a sleeve outer ring 10, a plurality of first balls 16, a plurality of second balls 18, an inner ring 22 and the shaft 2. The sleeve outer ring 10 has a pair of outer raceway grooves 24 on an inner circumference surface of the sleeve outer ring 10. The shaft 2 has a small diameter portion 26 and a large diameter portion 28 formed with an inner raceway groove 30 on the outer circumference surface of the large diameter portion 28. The inner ring 22 is fixed on the small diameter portion 26 of the shaft 2. The first balls 16 are disposed between one outer raceway groove 24 of the sleeve outer ring 10 and an inner raceway groove 20 formed on an outer circumference surface of the inner ring 22 with the inner raceway groove 20 formed on the outer circumference surface of the inner ring 22. The second balls are disposed between the other outer raceway groove 24 of the sleeve outer ring 10 and the inner raceway groove 30 of the large diameter portion 28 of the shaft 2. The large diameter portion 28 of the shaft 2 is fitted in the annular hole of the housing 5. The sleeve outer ring 10 is fitted in the central hole of the rotor 1 with one end portion of sleeve outer ring 10 located in the cylindrical projection portion 12. Further, since the spindle motor shown in FIG. 2 is not for ZIP, the disk putting face 1a of the rotor 1 is not provided with the magnet 1d to function as a disk clamper. Further, the parts or portions identical with or relevant to the ones in FIG. 1 are indicated identically.

Also in this "shaft fixed type" spindle motor shown in FIG. 2, by making the housing 5 made of resin, the effect as well as in the case where the housing 5 of the spindle motor of FIG. 1 is made of resin, can be obtained.

EXAMPLE

Hereinafter, in the shaft rotary type of spindle motor shown in FIG. 1, what differences of the cost, rotation noise and rotation precision between the conventional metal made housing 5 and the one which is made of the super engineering plastic of the present invention are there are compared as follows.

Comparing the spindle motor with the conventional spindle motor; first, from cost viewpoint, 33 to 50% is reduced. Further, as to the rotation noise, in the case at 25 cm far from the motor, 8% of noise reduction is measured. Further, as to the rotation precision, it is observed that Non-Repetitive-RunOut is improved in the axial direction of the shaft 2 by 5.5% and in the radial direction by 15%.

From a viewpoint of the material cost, when comparing the four kind of super engineering plastic, the LCP is highest followed by the PES, the PSF and the PPS in order.

Since the present invention is thus constituted, the following effects are derived therefrom. First, according to the first feature of the spindle motor of the present invention, it is possible to reduce the manufacturing cost of the spindle motor by reducing the cost of the parts of the housing of the spindle motor. Also, it is possible to reduce the rotation noise of the spindle motor and make a further increasing of the rotation precision.

Further, according to the second aspect of the spindle motor of the present invention, it becomes possible to a desired mechanical property to obtain a highly functional spindle motor, even though the housing is made of a resin. Further, according to the third and fourth aspects of the spindle motor, it becomes possible to provide a spindle motor for a disk driving having desired functions at a low cost.

What is claimed is:

1. A spindle motor for a disk driving device, comprising:
   a housing having an annular hole and a cylindrical projection portion formed integrally with the housing;
   a stator comprising a stack and coils wound around the stack, the stator is mounted on an outer circumference of the cylindrical projection portion of the housing to confront a magnet;
   a lead wire of the coils is connected to an electric supplying connector portion; and
   a rotor having a central hole and a downwardly depending flange at an outer periphery thereof, the magnet is disposed on an inner peripheral surface of the downwardly depending flange of the rotor, the rotor supported rotatably relative to the housing by a bearing means, the bearing means is a double row ball bearing and comprising a sleeve outer ring, a plurality of first balls, a plurality of second balls, an inner ring and a shaft, the sleeve outer ring having a pair of outer raceway grooves on an inner circumference surface of the sleeve outer ring, the shaft having a small diameter portion and a large diameter portion with an inner raceway groove on the outer circumference surface of the large diameter portion, the inner ring is fixed on the small diameter portion of the shaft, the first balls are disposed between one outer raceway groove of the sleeve outer ring and an inner raceway groove formed on an outer circumference surface of the inner ring, the second balls are disposed between another outer raceway groove of the sleeve outer ring and the inner raceway groove of the large diameter portion of the shaft, wherein the large diameter portion of the shaft is fitted in the annular hole of the housing, the sleeve outer ring is fitted in the central hole of the rotor, one end portion of the sleeve outer ring being located in the cylindrical projection portion and the housing and rotor are made of a super engineering plastic material and are unitarily formed by injection molding.

2. A spindle motor for a disk driving device according to claim 1, wherein the super engineering plastic material is selected from liquid crystal polymer (LCP), polyphenylene sulfide (PPS), polythersulfon (PES) and polysulfon (PSF).

3. A spindle motor for a disk driving device according to claim 1, wherein the lead wire is connected to the electric supplying connector portion through a through-hole formed in the housing.

4. A spindle motor for a disk driving device according to claim 1, wherein the electric supplying connector portion is molded with the housing in a unitary manner.

5. A spindle motor for a disk driving device according to claim 1, wherein the lead wire is connected to a flexible printed circuit board (FPC).

6. A spindle motor for a disk driving device according to claim 1, wherein the magnet is a rubber magnet.

7. A spindle motor for a disk driving device according to claim 1, wherein the spindle motor is for a hard disk drive.

8. A spindle motor for a disk driving device according to claim 1, wherein the housing having the annular hole and the cylindrical projection portion is formed therewith as a one-piece member.

* * * * *